United States Patent
Burkhard et al.

[11] Patent Number: 5,647,465
[45] Date of Patent: Jul. 15, 1997

[54] TRANSMISSION SHIFT LEVER AND BRAKE INTERLOCK CONTROL ASSEMBLY

[75] Inventors: Harley David Burkhard; Frederick Henry Kleinfeld, both of Saginaw, Mich.

[73] Assignee: General Motors Corporation, Detroit, Mich.

[21] Appl. No.: 615,934

[22] Filed: Mar. 14, 1996

[51] Int. Cl.$^6$ .............................. B60K 41/26; B60K 20/02
[52] U.S. Cl. ........................... 192/4 A; 74/475; 74/483 R; 74/527
[58] Field of Search ............................ 192/4 A; 74/475, 74/483 R, 527

[56] References Cited

U.S. PATENT DOCUMENTS

| | | | |
|---|---|---|---|
| 5,027,931 | 7/1991 | Radtke et al. | 192/4 A X |
| 5,379,871 | 1/1995 | Asano et al. | 192/4 A |
| 5,465,818 | 11/1995 | Osborn et al. | 192/4 A |
| 5,490,585 | 2/1996 | Togano | 192/4 A |
| 5,542,512 | 8/1996 | Maehara | 192/4 A |

*Primary Examiner*—Richard M. Lorence
*Attorney, Agent, or Firm*—Donald F. Scherer

[57] ABSTRACT

A transmission shift control lever assembly includes a shift detent gate in which a portion of the shift lever is disposed. A latch member is pivotally mounted relative to the gate and is selectively positionable to open and close a path between a "Park" position and other operating positions. The latch is responsive to a spring, an electro-magnetic element or assembly, the lever and a bias spring to establish its position. A one-way device is disposed between the electro-magnet and the latch member such that the shift lever bias spring will urge the shift lever to pivot the latch member into the "Park" position even when the electro-magnet is operating to hold the latch member in the open position.

2 Claims, 4 Drawing Sheets

TRANSMISSION SHIFT LEVER AND BRAKE INTERLOCK CONTROL ASSEMBLY

TECHNICAL FIELD

This invention relates to transmission shift controls and more particularly to such controls including a brake transmission shift interlock.

BACKGROUND OF THE INVENTION

Brake/transmission shift interlocks (BTSI) are being used on current automotive automatic shifting transmissions. The function of the BTSI is to prevent the transmission manual shift lever from being manipulated out of the "Park" position prior to the service brakes of the vehicle being activated. BTSI's are installed on both console mounted shift lever assemblies and steering column mounted shift lever assemblies. The column mounted assemblies generally incorporate a solenoid controlled lever which is positionable to latch the column linkage intermediate the manual lever and the transmission when the "Park" position is attained in the transmission and the vehicle service brakes are not activated. When the operator actuates or depresses the service brake pedal, the lever releases the linkage to permit removal of the column mounted lever from the "Park" position. As a general rule, the brake pedal activates the electrical switch which is disposed within the brake circuit. The brake switch is generally opened during this activation to deenergize an electro-magnet which will release the latching lever of the BTSI assembly.

SUMMARY OF THE INVENTION

The present invention incorporates a BTSI control directly mounted on the manual shift lever control. The BTSI control is disposed such that a latch is pivotally mounted to open and close a path between a "Park" position is a detent plate and other operating positions. The manual shift lever or manual control lever has a finger or extension element which engages or is within the gate path formed in the detent plate. The latch member portion of the BTSI is pivoted to prevent the finger and therefore the shift lever from traversing the detent plate. The position of the lever is controlled by a plurality of elements including a bias spring which applies a light load to pivot the lever out of the gate path, an electro-magnet which secures the lever in a position in which it is found relative to a stationary core and a strong bias spring disposed on the transmission shift lever which urges the shift lever in a direction to engage the latch and pivot it into the closed position irrespective of the action of the latch bias spring.

The electro-magnet might interfere with this return of the latch to the closed position should it be energized when the transmission shift lever is moved to the "Park" position. However, a one-way device between the stationary or core component of the electro-magnetic device and the latch is operable to permit a load imposed by the bias spring of the shift lever to overcome the latching position of the electro-magnet.

It is therefore an object of this invention to provide an improved transmission shift control and BTSI assembly wherein the BTSI assembly includes a latch which is disposable to restrict or permit free access of a manual shift lever within the gate path of a detent gate plate.

DESCRIPTION OF AN EXEMPLARY EMBODIMENT

Figure 3:
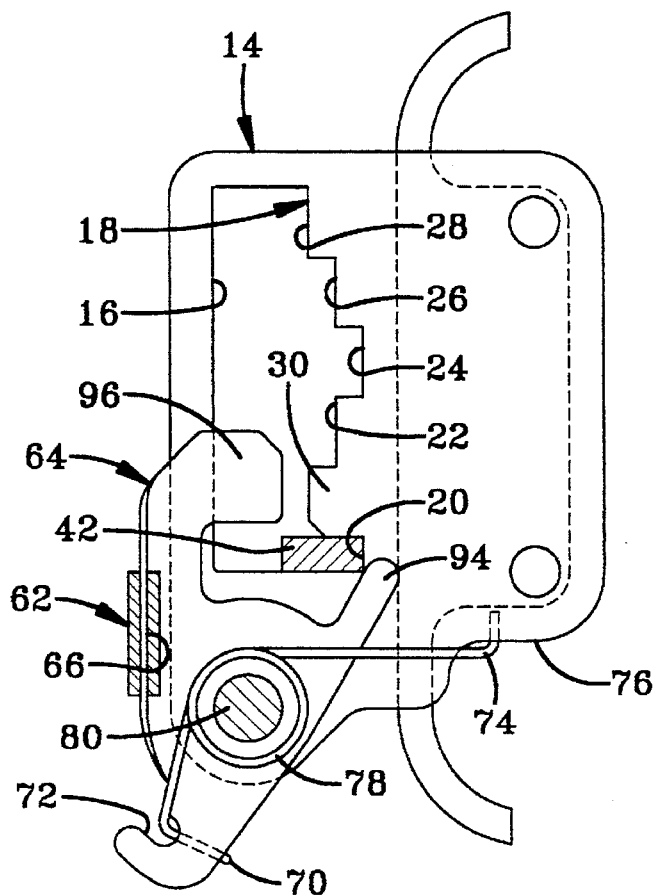
FIG. 3 is a view taken along line 3—3 of FIG. 1 showing the BTSI latch in one position of operation.
Figure 4:
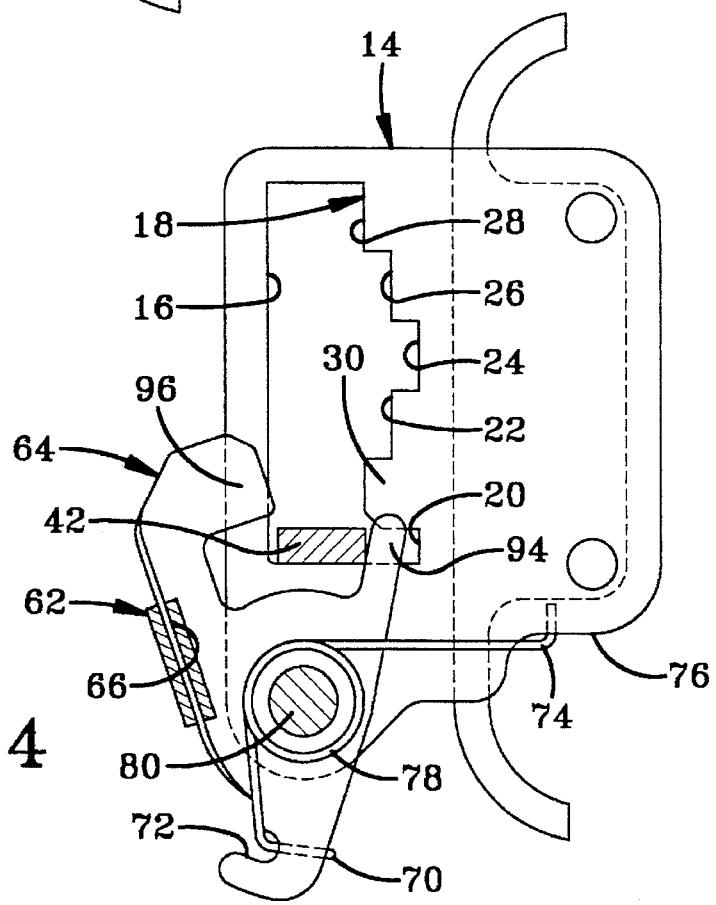
FIG. 4 is a view similar to FIG. 3 showing the BTSI latch in a second position of operation.
Figure 5:
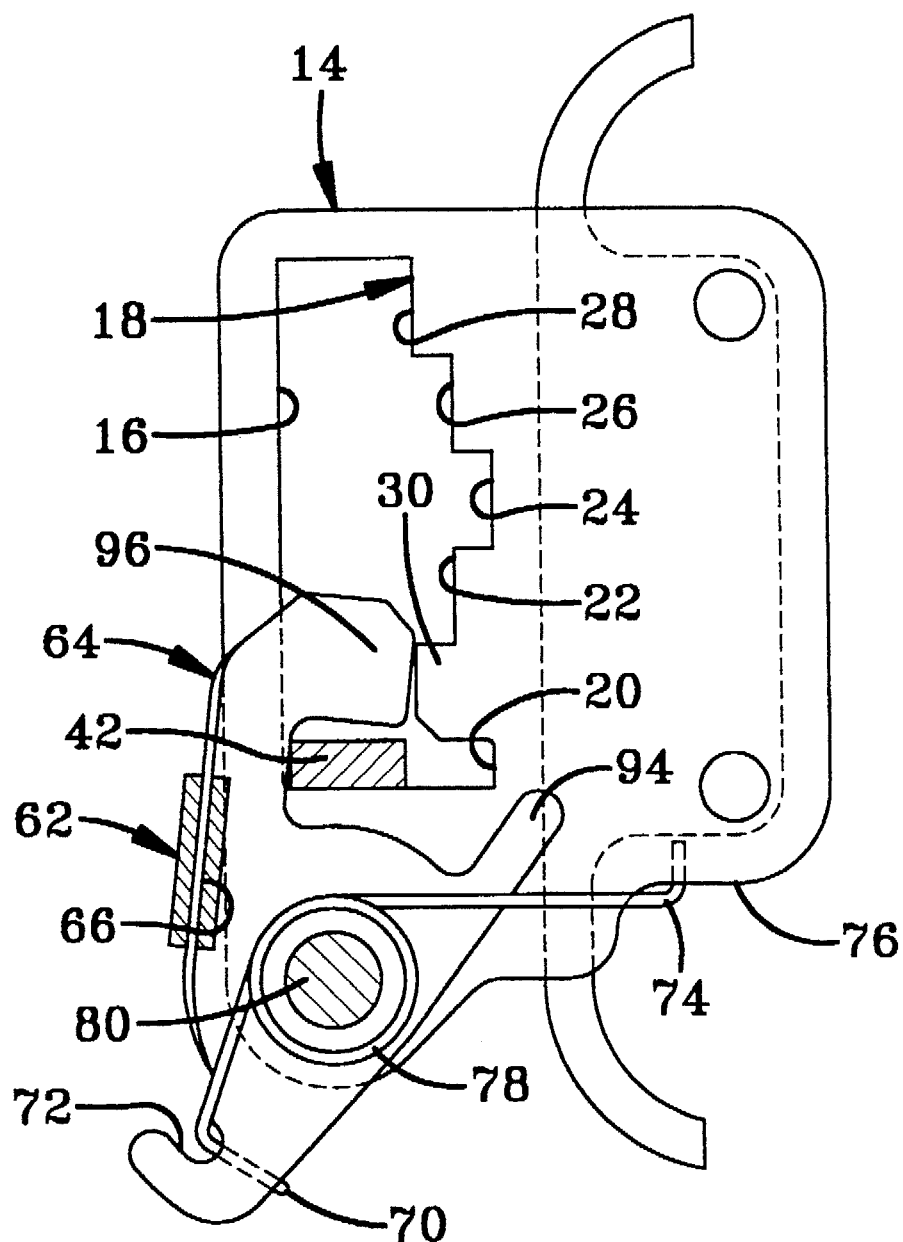
FIG. 5 is a view similar to FIG. 3 showing the manual lever in a different operating position from that shown in FIG. 3.

A power transmission manual control lever assembly 10 includes a support plate 12 which is used to secure the assembly to the vehicle structure. On the support plate is secured a shift detent plate 14. The detent plate 14 has formed therein a detent gate 16 which incorporates a detent slot or path 18, and as best seen in FIGS. 3 through 5, a plurality of detent positions 20, 22, 24, 26 and 28. The position 20 represents the "Park" position and has a tooth or raised portion 30 disposed between position 20 and position 22 representing reverse.

Figure 1:
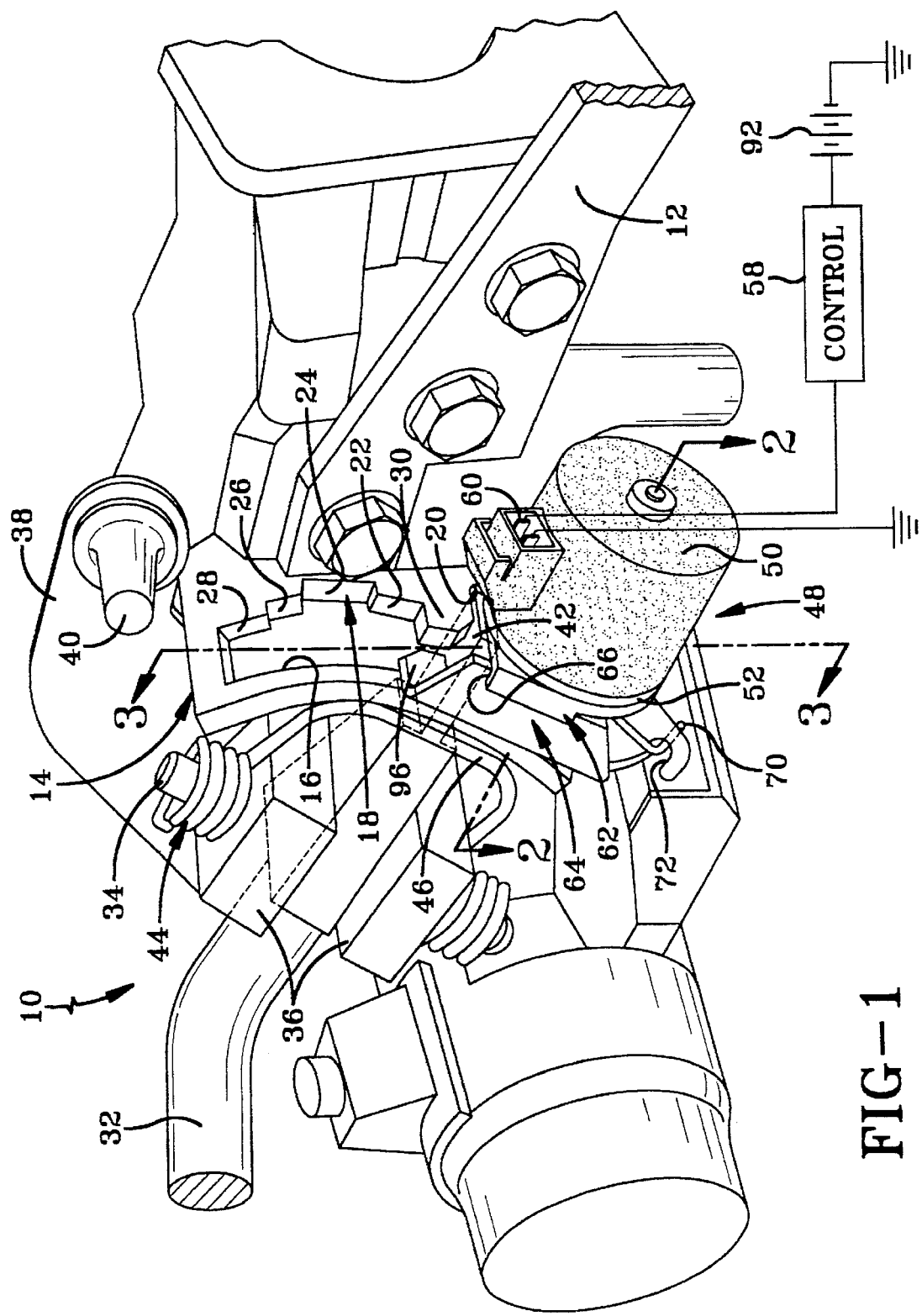
FIG. 1 is an isometric view of a portion of a manual shift lever assembly incorporating the present invention.

The assembly 10 also includes a manual shift lever 32 which is pivotally mounted at pins 34 on a support 36. The shift lever 32 also has secured therewith an output lever 38 which has a cable connector 40 which is adapted to provide a cable connection between the lever 32 and the transmission not shown. The transmission lever 32 has a finger or extension portion 42 which extends into the detent path 18. The extension 42 has imposed thereon a bias force by a spring 44 which is disposed on the pins 34 and has a lever arm 46 which engages the extension 42. As seen in FIG. 1, the spring 44 is disposed to bias the extension 42 toward the detent positions such as that shown in FIG. 3. That is, the spring 44 will bias the extension 42 to abut the detent positions 20, 22, 24, 26 or 28, depending upon the alignment of the lever 32. In order for the lever 32 to be manipulated from the "Park" detent position 20, the lever 32 must be pivoted such that the finger extension 42 is raised above the tooth 30 and then the lever 32 can be pivoted on the support 36.

To ensure that the manual shift lever 32 cannot be removed from the "Park" position to a drive condition prior to the activation of the vehicle service brakes, a BTSI assembly 48 is provided. This BTSI assembly 48 includes an electro-magnetic actuator 50 which is secured in a stationary position on the detent plate 14 through a brake plate 52. The electro-magnetic actuator 50 has a core member 54 surrounded by a coil of electrical wire 56 which is connected to an electrical control circuit 58 to a connector 60.

When the coil 56 is energized, a brake plate 52 is pulled into magnetic attraction with the core member 54 to limit the rotation of the latch plate 62. The latch plate 62 is drivingly connected with a park latch arm 64 at a recess 66. The park latch arm 64 is urged in one direction by a release or bias spring 68 which has a first arm 70 attached to a notch 72 formed in the park latch arm 64, a second arm 74 abutting a wall 76 of the gate 14 and a coil portion 78 which surrounds a post 80 secured on the park latch 64. The force in the spring 68 is such that the latch arm 64 will be pivoted counterclockwise as seen in FIGS. 3 through 5. That is, the spring 68 will attempt to rotate the latch arm 64 so as to open the path or detent slot 18.

A wave spring 82 is disposed between a bushing 84 supported in the latch plate 62. The spring 82 will urge the latch plate 62 toward the brake plate 52 with a predetermined amount of force. The latch plate 62 has a plurality of unidirectional teeth 86 formed thereon which mesh with a plurality of teeth 88 formed on the brake plate 52.

Figure 2:
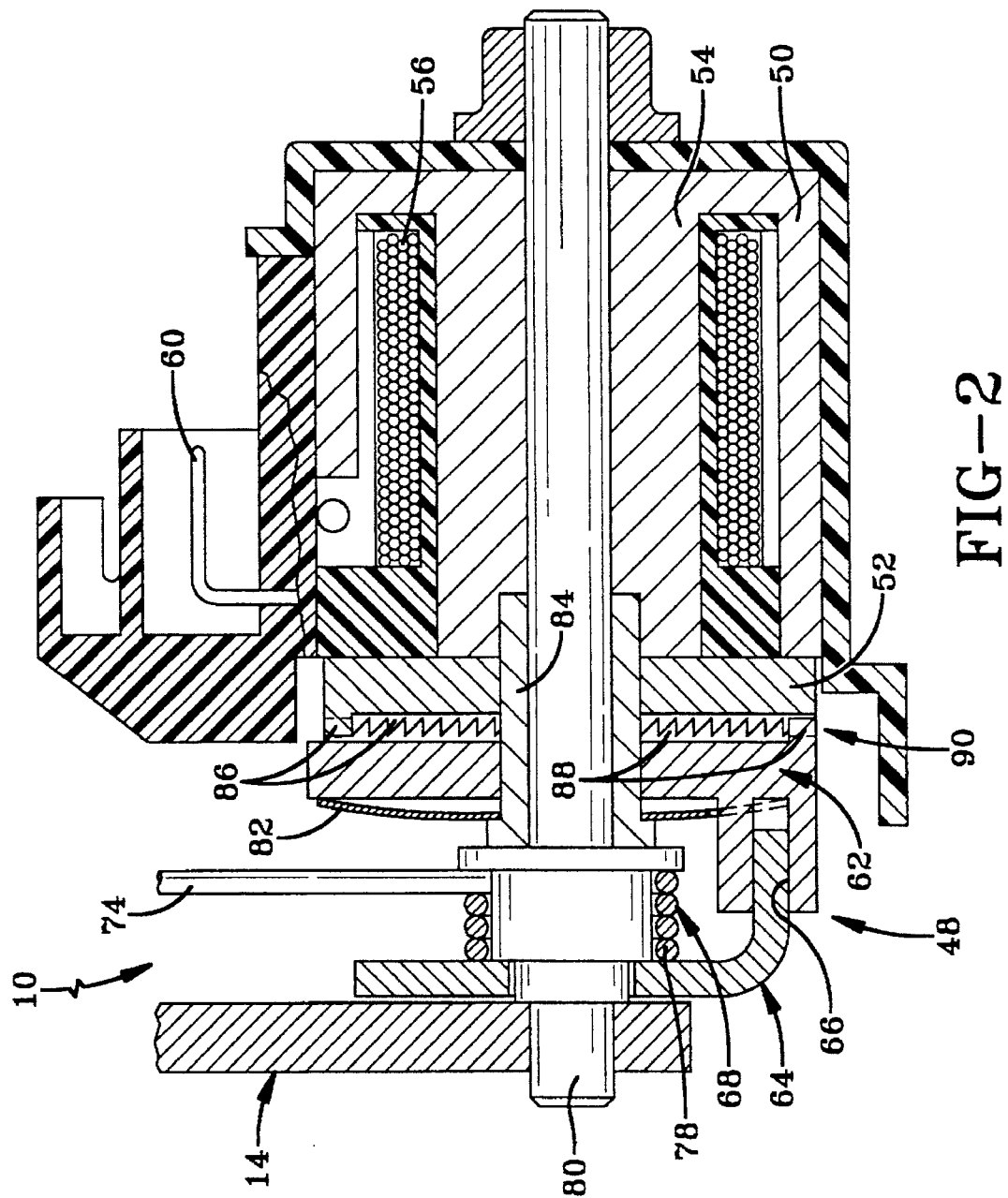
FIG. 2 is a view taken along line 2—2 of FIG. 1.

As best seen in FIG. 2, the teeth 86 and 88 mesh in a manner which will permit relative rotation between the elements 62 and 52 in one direction but prevent rotation in the opposite direction. To this extent, the teeth 86 and 88 comprise a one-way mechanism 90 disposed between the latch plate 62 and the brake plate 52.

The control 58 is preferably disposed within an electrical circuit of the vehicle and is powered by the vehicle electrical source 92. The control 58 includes conventional electronic devices, such as switches, which permit the control of current flow through the coil 56. At least one switch within the control 58 will be actuated by the vehicle service brake, not shown. This switch will permit the control 58 to determine the actuated position of the service brake. Another such switch in the control 58 might be associated with the "Park" position of the power transmission. A still further switch within the control 58 would be associated with the vehicle ignition system. With these three switches, the control 58 has sufficient intelligence to determine (1) if the operator has indeed turned the ignition to a position desired to operate the vehicle; (2) the vehicle transmission is indeed in the "Park" position; and (3) the condition of the vehicle service brakes.

If the vehicle service brake is not operated and the ignition switch is closed, the electro-magnetic actuator 50 will be energized in an attempt to hold the latch arm 64 in the position in which it is found when the system is energized. For example, look at FIGS. 3 and 5, if the transmission shift lever is in the "Park" position and the latch has been forced to the closed position, the electromagnet will energize to secure the latch in the position shown. When this occurs, the manual shift lever can be manipulated such that the finger extension 42 will align, as seen in FIG. 5, with the park latch arm 64. However, the lever 32 cannot be pivoted in a manner that will manipulate the lever from the "Park" position since the latch arm 64 interferes with such motion.

If, however, the transmission shift lever is manipulated to the position shown in FIG. 3 or 5 and the vehicle service brake is actuated, the electro-magnet will be deenergized, thus permitting the latch arm 64 to move to the position shown in FIG. 4 whenever the manual control lever is moved to the position shown in FIG. 5. The pivoting of the latch arm 64 under these conditions is controlled by the spring 68. This spring, as previously mentioned, will rotate the latch arm 64 counterclockwise when the other bias forces are removed. Thus, the shift lever cannot be removed from the "Park" position without the vehicle service brakes being energized if the ignition is actuated to at least a run condition.

The manual control lever 32 is manipulated to the other positions, such as reverse 22, neutral 24, drive 26, or intermediate or low 28 during vehicle operation. However, when it is desired to place the transmission control in the "Park" position, the latch arm 64 will generally be in the position shown in FIG. 4. That is, the bias spring 68 will have positioned the latch arm 64, and if the service brake has not been actuated, the electro-magnet 50 can be energized to hold the latch in this position. When the extension 42 is manipulated along the path 18 to the "Park" position as seen in FIG. 4, an arm 94 formed on the latch arm 64 will be engaged by the extension 42.

Whether the electro-magnet 50 is energized or not, the spring 44 will impose a significant force to the extension 42 on the arm 94. If the electromagnet 50 is not engaged or activated, the latch 64 will be pivoted to the position shown in FIG. 3 as the extension 42 enters the park detent 20. However, if the service brake have not been activated, the electro-magnet 50 will be energized thereby attempting to hold the latch 64 in the position shown in FIG. 4. The one-way mechanism comprised of the teeth 86 and 88 will permit the latch arm 64 to pivot toward the position shown in FIG. 3. This one-way mechanism will not permit return of the latch arm, however, and the electro-magnet will retain its holding force such that having achieved the position shown in FIG. 3 the latch will remain in that position even if the finger 42 is moved to the position shown in FIG. 5 unless the service brakes have been actuated. Thus, the one-way mechanism assists in permitting return of the latch arm 64 to the latching position shown in FIGS. 3 and 5, wherein an extension 96 is disposed within the detent slot 18, which as previously explained, will prevent manipulation of the finger extension 42 out of the "Park" position.

We claim:

1. A transmission shift control assembly comprising:

a pivotally mounted manual shift lever;

a shift gate cooperating with said shift lever to establish a plurality of operating conditions including "Park";

a selectively energizable electromagnetic mechanism including a latch member for selectively engaging a portion of said manual lever to retain said manual lever in "Park" and permitting release of said portion upon actuation by an operator of a vehicle control member; and a one-way clutch disposed adjacent said latch on said electromagnetic mechanism for permitting manipulation of said latch when said electromagnetic mechanism is energized and said manual lever is moved to the "Park" condition from another condition.

2. A transmission shift control assembly comprising:

a detent plate having a detent slot;

a pivotally mounted shift lever having a finger extension disposed within said detent slot;

a pivotally mounted latch member having a latch portion operable in a first position of the latch member to cooperate with a park slot and a detent on said detent plate to close the detent slot to restrict the shift lever to the park slot, and operable in a second position of the latch member to open the detent slot to permit free ingress and egress of the finger extension from the park slot;

a resilient member urging said latch member to the second position;

a selectively energizable magnetic actuator mechanism for inhibiting the latch member from pivoting when energized and permitting pivoting of the latch member when deenergized; and a one-way mechanism for permitting the latch member to be pivoted by the finger extension from the second position to the first position when said shift lever is moved to a "Park" position when said electro-magnetic actuator is energized.

* * * * *